United States Patent
Lapeyre

[15] 3,685,098
[45] Aug. 22, 1972

[54] SHRIMP SEPARATING AND PEELING MACHINE

[72] Inventor: James M. Lapeyre, New Orleans, La.

[73] Assignee: The Laitram Corporation, New Orleans, La.

[22] Filed: Oct. 14, 1970

[21] Appl. No.: 80,623

[52] U.S. Cl. .........................17/73, 74/216.5, 146/55
[51] Int. Cl. ...............................................A22c 29/00
[58] Field of Search ....17/71, 73, 11.1; 130/5 C, 5 D, 130/5 H, 5 J, 30 G; 146/55; 74/216.5

[56] References Cited

UNITED STATES PATENTS

| 2,755,501 | 7/1956 | Samanie | 17/73 |
| 3,414,106 | 12/1968 | Moran et al. | 74/216.5 |
| 2,778,055 | 1/1957 | Lapeyre et al. | 17/73 |

FOREIGN PATENTS OR APPLICATIONS

| 923,988 | 4/1963 | Great Britain | 74/216.5 |

*Primary Examiner*—Lucie H. Laudenslager
*Attorney*—Wilkinson, Mawhinney & Theibault

[57] ABSTRACT

In order to obtain a more positive drive of separator and peeling pairs of rollers in shrimp peeling machines, a splined drive shaft and splined sprockets on the rollers cooperate with internally toothed belts in mesh with the drive shaft and rollers which is found to result in more complete peeling results.

3 Claims, 5 Drawing Figures

PATENTED AUG 22 1972

INVENTOR
JAMES M. LAPEYRE

BY
Wilkinson, Mawhinney and Thiebault
ATTORNEYS

INVENTOR
JAMES M. LAPEYRE

SHRIMP SEPARATING AND PEELING MACHINE

The present invention relates to Shrimp Separating and Peeling Machine and has for an object certain improvements over the similarly entitled invention and apparatus described and illustrated in U.S. Pat. No. 2,755,501 granted July 24, 1956, to Robert J. Samanie in which oppositely rotating pairs of shrimp peeling rollers are driven from a common drive shaft by crossed belts for imparting to the pairs of rollers rotation in relatively opposite directions so that the peeling surfaces of the rollers move together downwardly through peeling nips to draw the peels from the shrimp meat and permit the meat to slide down the rollers which are axially inclined to a receptacle or other appropriate destination.

More specifically the invention has for its main object to produce a more effective drive for the pairs of peeling rollers whereby to ultimately attain a more effective and a more positive peeling action in which the rollers are more positively driven and slippage is largely eliminated.

Another object of the invention is to provide positive driving connections from the drive shaft to the transmission belts and from the latter to the pairs of peeling rollers to avoid incidental lost motion in the drive of the peeling rollers to counteract any tendency of the belts to wander axially on the drive shaft and in general to secure ultimately good and uniform results in the peeling operation.

A further object of the invention is to provide novel cooling means for the journals of the peeling rollers and a new form of mounting for such journals whereby to avoid overheating the journals and consequent malfunctions of the rollers.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
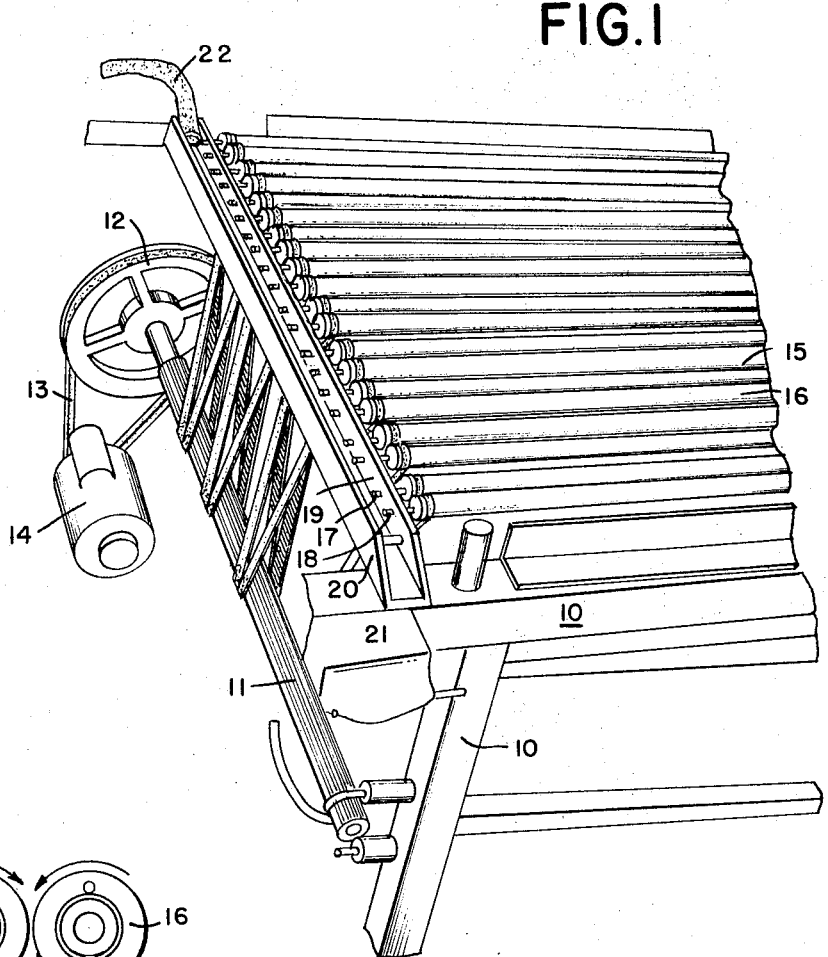
FIG. 1 is a fragmentary perspective view of a Shrimp Separating and Peeling Machine constructed in accordance with the present invention illustrating the new construction of mounting of the peeling rollers, the new construction of the drive shaft and the new construction of the pairs of drive belts.

Referring more particularly to the drawings, 10 designates a machine frame in which is journaled a drive shaft 11 driven by a pulley wheel 12 from a belt 13 in turn driven by an electric motor 14. Any other appropriate drive may be substituted.

The drive shaft drives pairs of peeling rollers 15 and 16, the journals 17 and 18 of which rollers are rotatably mounted, in one or more walls 19 and 20 of an inclined trough having a bottom wall 21. These walls 19, 20 and 21 are inclined and the trough is fed through a fluid supply connection 22 with cooling liquid, for instance water, at the high end of the trough 19.

Figure 2:
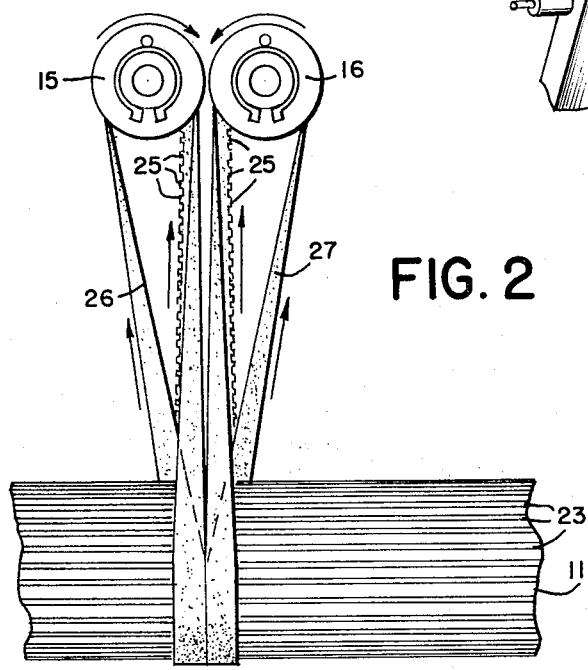
FIG. 2 is a fragmentary side elevational view of the modified form of drive shaft and of a pair of crossed belts for driving a pair of the peeling rollers in relative opposite directions.

Referring more particularly to FIG. 2, 23 represents splines on the drive shaft 11, such splines running axially along the external cylindrical surface of the drive shaft and such splines being spaced apart circumferentially.

Similar spaced matching teeth 24 and 25 are provided upon internal surfaces of transmission belts 26 and 27 which are lapped about the drive shaft 11, the teeth 23 thereof intermeshing with the teeth 24 and 25 on the internal surfaces of the belts 26 and 27 so that a drive connection is made between the drive shaft 11 and belts 26 and 27. The teeth 24 and 25 on the belts 26 and 27 are spaced apart similarly to the splines 23 of the drive shaft 11 so that the teeth 24 and 25 are in driven relationship with the drive shaft 11 without appreciable lost motion.

The belts 26 and 27 are arranged to drive the pairs of peeling rollers 15 and 16 as shown by the arrows in FIG. 2. These belts, 26 and 27, are also crossed as indicated in FIG. 2 so that the pairs of peeling rollers 15 and 16 will be driven in relatively opposite directions, that is with their peripheries moving together downwardly as shown by the arrows.

Figure 3:
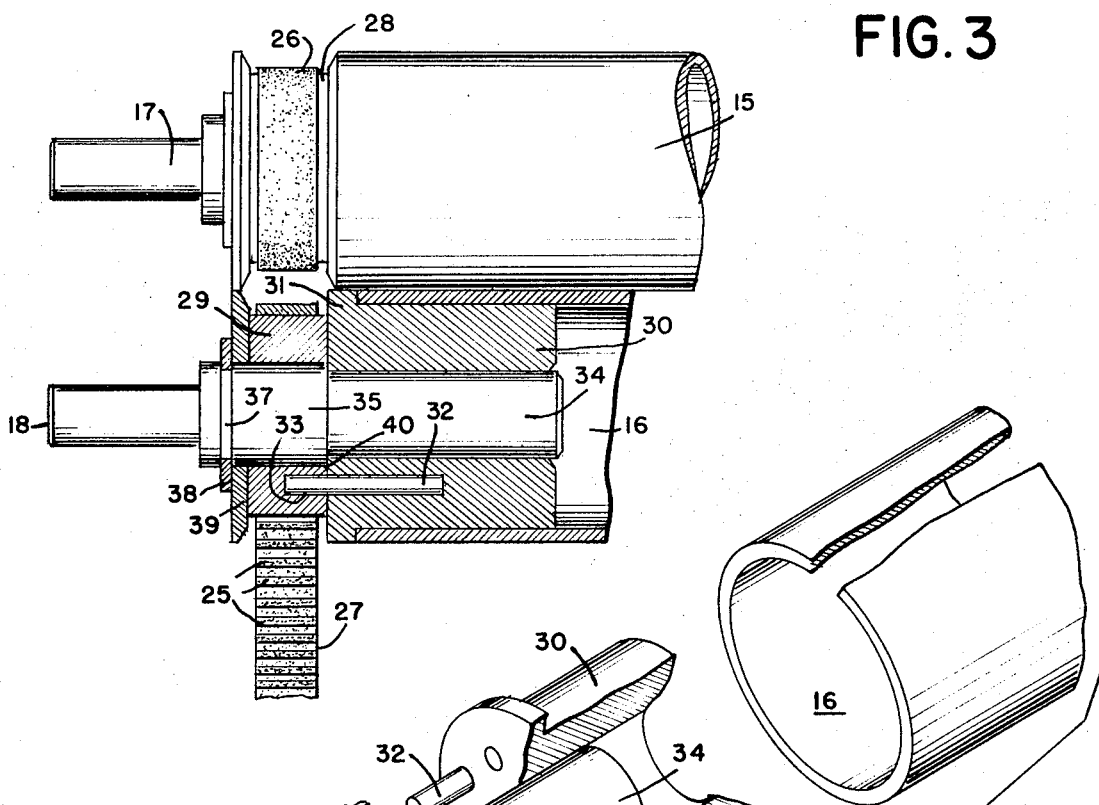
FIG. 3 is a fragmentary enlarged sectional view taken through a pair of the pelling rollers showing the association of journals, belts and drive sprockets.
Figure 4:
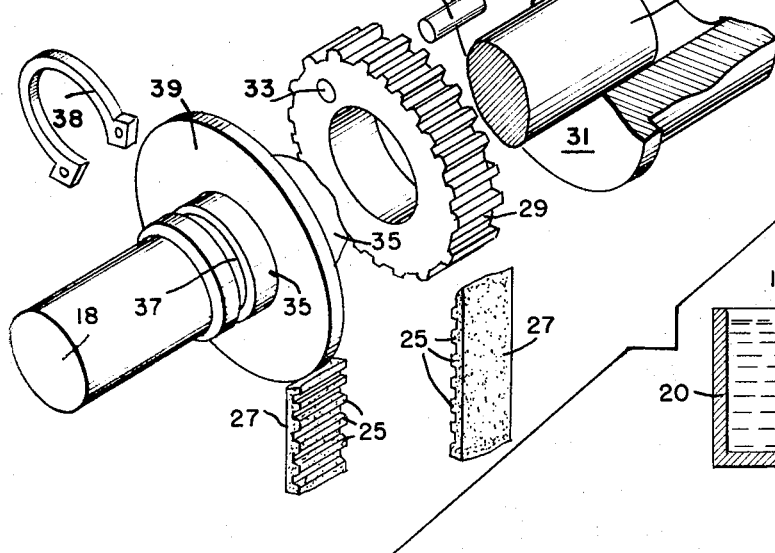
FIG. 4 is an exploded perspective view of one of the drive rollers showing a preferred method of mounting of the same and portions of the toothed belts and one of the splined sprockets or gear wheels.
Figure 5:
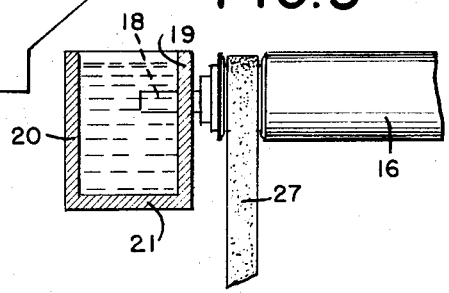
FIG. 5 is a vertical sectional view through the cooling trough in which the journals of the peeling rollers are mounted and which is adapted to contain at all times a body of cooling water or other liquid under flowing conditions.

As shown more particularly in FIGS. 3 and 4, the belts 26 and 27 are trained about sprockets 28 and 29 arranged co-axially with the peeling rollers 15 and 16 and in driving relation with such rollers 15 and 16.

Still referring to FIGS. 3 and 4, plugs or bushings 30 are drifted or driven into the adjacent ends of the hollow rollers 16 and 16. These bushings are preferably flanged as shown at 31, the flanges 31 being abutted against ends of the rollers as shown to best advantage in FIG. 3. The bushings 30 have a frictional or other type driving fit within the rollers 15 and 16 and the flanges 31 also function to limit and arrest the movement of the bushings 30 in the act of being driven into the rollers 15 and 16.

In effect the bushings 30 form reinforced end portions of the peeling rollers 15 and 16, rotate with the peeling rollers and act as mounts for the rollers upon trunnions 34 which derive support from the journals 17 and 18 of which they are or may be integral parts.

Between the journals 18 and trunnions 34 are hubs 35 of enlarged diameter over both the journals and trunnions to constitute shoulders 40 abutting the exterior faces of the bushings 30 acting as limit stops to restrict the degree of penetration of the trunnions 34 into the bushings 30 and therefore regulating the final positions of projection of the journals 17 and 18 from the adjacent ends of the peeling rollers 15 and 16 and insuring proper projection of the journals 17 and 18 for proper mounting in the wall or walls 19 and 20 of the cooling trough.

The hubs 35 provide support for the sprockets 28 and 29. Projecting outwardly from the bushings 30 are drive pins 32 positioned to enter eccentric holes 33 in the sprockets 28 and 29, constituting a driving fit by which the rotation of the sprockets 28 and 29 is transmitted through the bushings 30 to the respective peeling rollers 15 and 16.

The sprockets 28 and 29 may be removably held to the hubs 35 by any suitable means, for instance by confining discs 39 having central openings sliding over the outer surfaces of the hubs 35 and abutting the sprockets 28 and 29, the discs 39 being retained by spring clips 38 fitting into circular grooves 37 in outer parts of the hubs 35. The journals 17 and 18 are parts of the hubs 35 and trunnions 34.

In operation, the rotation of the drive shaft 11 imparts motion to the belts 26 and 27 and thereby to the sprockets or gear wheels 28 and 29 in relatively opposite directions, causing adjacent rollers 15 and 16 to mutually rotate in a complementary pattern with their peeling surfaces descending together to common peeling nips whereby the rough shells are pulled from the meat through the nips of the roller pairs while the slippery meat is rejected and slides down the troughs between the axially inclined rollers to a recovery station at the lower ends of such rollers.

The teeth or ribs 24 and 25 reinforce and strengthen and stiffen the belts 26 and 27, contributing to long life and absence of slippage, which latter increases the effectiveness and yield of the machine, as well as reducing mutilation of the meats, thereby assuring highest prices for the products in the market place.

The complimentary intermeshing splines or teeth on the drive shaft 23 and belt pairs 26 and 27 prevents wandering of the belts relatively to the drive shaft in axial directions and the use of wider splined belts gives greater contact area between belts and drive shaft, longer spline engagement, counteraction against belts rocking on the shaft and in general produces a more direct, more positive drive and action at the peeling zones.

WHAT I CLAIM IS:

1. A separating and peeling machine for shrimp or the like comprising
    a. a unit of two substantially parallel separator and peeling rollers,
    b. plugs fitted fast in end portions of the rollers and projecting beyond such ends of the rollers,
    c. splined sprockets mounted to the projecting end portions of the plugs,
    d. pin means between said sprockets and plugs coupling the plugs and rollers to rotate with the sprockets,
    e. journals mounted in the plugs and projecting outwardly beyond the sprockets for supporting the rollers in the machine,
    f. a splined drive shaft journaled in the machine, the axis of which is disposed angularly relative to the axis of the separator and peeling rollers, and
    g. internally toothed belts reversely twisted to drive said rollers in relatively opposite directions in mesh with said splined drive shaft and separately with the sprockets connected to said rollers.

2. A separating and peeling machine for shrimp or the like, as claimed in claim 1, further comprising
    j. a trough for cooling fluid in which said journals are rotatably mounted.

3. A separating and peeling machine for shrimp or the like as claimed in claim 2, in which
    k. said trough is inclined, and
    l. means for supplying liquid coolant to the high end of the trough.

* * * * *